United States Patent [19]
Zilber

[11] Patent Number: 4,809,836
[45] Date of Patent: Mar. 7, 1989

[54] CONVEYOR RETARDER

[75] Inventor: Eugene A. Zilber, Mt. Sterling, Ohio

[73] Assignee: Versa Corporation, Mt. Sterling, Ohio

[21] Appl. No.: 93,731

[22] Filed: Sep. 8, 1987

[51] Int. Cl.⁴ .......................................... B65G 13/00
[52] U.S. Cl. ................................... 193/35 A; 198/781
[58] Field of Search ...................... 193/32, 35 A, 40; 198/634, 781

[56] References Cited
U.S. PATENT DOCUMENTS
3,724,642 4/1973 DeGood .
4,542,815 9/1985 Leemkuil .
4,600,093 7/1986 Adams ............................ 193/35 A Primary Examiner—Joseph E. Valenza
Attorney, Agent, or Firm—Litman McMahon & Brown

[57] ABSTRACT

A conveyor system includes a conveyor and an article retarder for slowing or stopping articles on the conveyor. The retarder comprises a trigger, a first switch engageable b the trigger when the trigger is struck by an article, a second switch connected to the first switch and to an actuator and a brake engaged by activation of the actuator. The first and second switch include a time delay such that, when triggered, the actuator engages the brake and after a predetermined period of time, the actuator disengages the brake thereby allowing the article to continue along the conveyor at a reduced speed.

10 Claims, 3 Drawing Sheets

CONVEYOR RETARDER

BACKGROUND OF THE INVENTION

The present invention is directed to conveyors and, in particular, to a conveyor wherein a braking system is utilized to slow or stop an article moving along the conveyor, especially a roller conveyor.

In many types of conveyor systems, it is necessary to completely stop or at least slow articles passing along the system. This is particularly true of roller conveyor systems utilizing gravity to motivate pallets, packages or other articles along the conveyor. In the patent to Leemkuil U.S. Pat. No. 4,542,815, a system was described for providing such a brake. The Leemkuil system functions adequately in some installations, especially when the articles being transported along the conveyor are all of approximately the same weight and all have approximately the same velocity at the time they engage the braking system or retarder shown in Leemkuil.

However, when articles passing along the conveyor are of substantially different weights and/or have substantially different velocities, the Leemkuil structure may fail to bring the articles to consistently the same velocity directly downstream of the retarder and may allow heavier articles to pass with little or no retardation. In particular, the release of the article in the Leemkuil system results from the bleeding of compressed air through a bleed valve directly associated with the actuator. Therefore, if a relatively heavy article directly engages the brake or engages and consequently tries to rotate a roller being held in position by such a brake, more pressure is exerted against the actuator than if a relatively light article makes the same engagement. Consequently, with a heavy article, the air in the actuator is urged through the bleed valve quicker and the braking mechanism is released faster. That is, for heavier articles, the delay time experienced because of the braking mechanism of Leemkuil is different than that of a lighter article.

As it was desirable to be able to completely stop or apply a continuous braking action for a predetermined amount of time in order to slow an article on a conveyor, especially a gravity roller type conveyor, it became desirable to develop a braking system in which the pressure within the actuator, resulting in a braking action, remained constant over a predetermined period of time and was not dependent upon the weight or velocity of articles being transported by the conveyor.

OBJECTS OF THE INVENTION

Therefore, the objects of the present invention are: to provide a conveyor system utilizing a pressurized fluid to operate an actuator and consequently a brake to retard articles passing along the conveyor and in which the delay time for releasing the brake is independent of the weight or velocity of the article, but rather is predetermined and set for a specific time period; to provide such a conveyor system in which the release of pressurized fluid from the actuator is a function of a secondary pressurized system which is not directly affected by the weight or velocity of articles passing along the conveyor; to provide such a system which functions both when the brake is applied directly to the article being transferred along the conveyor or the brake is applied to one or more rollers along the conveyor; and to provide such a conveyor which is easy to manufacture, simple to use and particularly well adapted for the intended purpose thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

Figure 1:
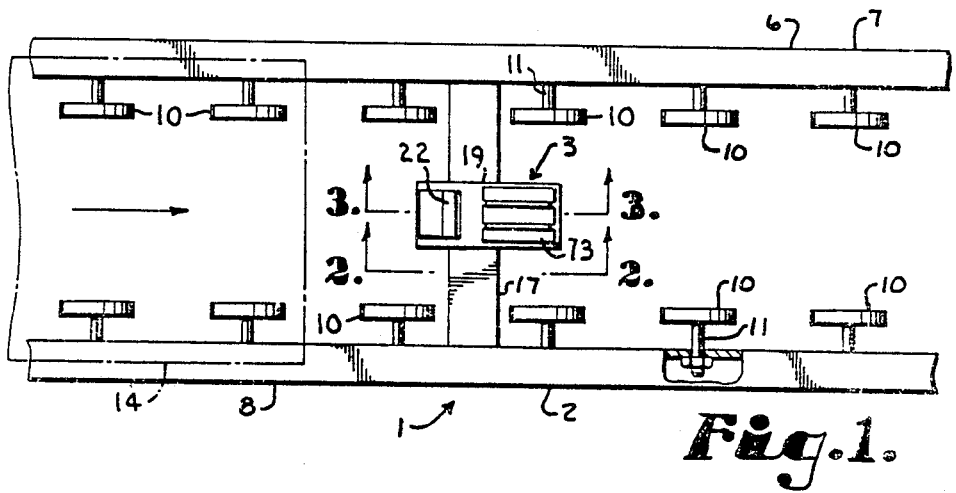
FIG. 1 is a top plan view of a conveyor showing an article in phantom passing along the conveyor and a braking system in accordance with the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

FIGS. 1 through 7 illustrate a conveyor system 1 including a roller conveyor 2 and a first embodiment of a conveyor retarder in accordance with the present invention generally designated by the reference numeral 3.

Figure 2:
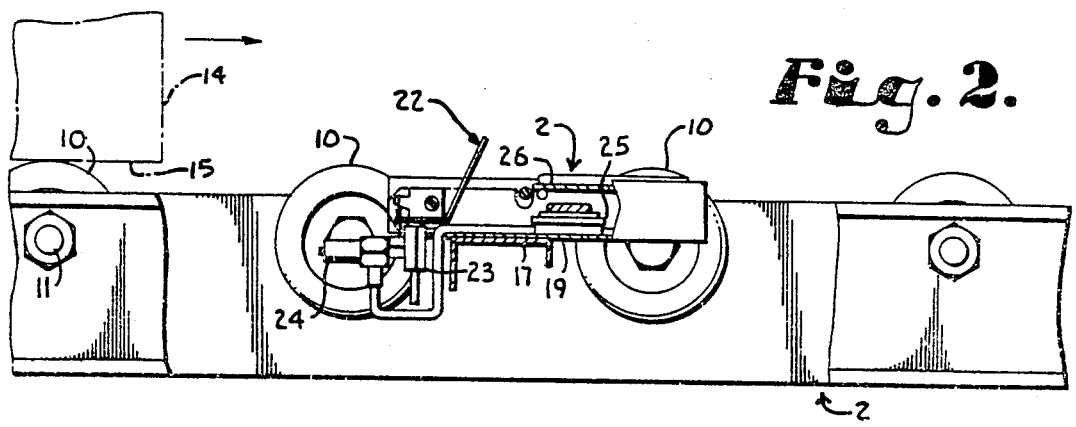
FIG. 2 is a side elevational view of the conveyor, the article, and the braking system with portions thereof broken away to show detail.

The roller conveyor 2 comprises an elongate track 6 having a pair of opposed and generally equally spaced C-shaped support channels 7 and 8 upon which a plurality of roller skate-type rollers 10 are pivotably mounted on an individual support shaft 11 secured to a respective channel 7 or 8. The rollers 10 are approximately equally spaced and are positioned so as to extend above the channels 7 and 8, as seen in FIG. 2.

A pallet, tote, box, package or other article 14 normally having a planar bottom 15 traverses along the track riding upon the rollers 10. As the rollers 10 of the present embodiment are not otherwise powered, the roller conveyor 2 is aligned to slant slightly in the direction of travel of the article 14, such that the article 14 is driven by gravity along the conveyor 2. Normally for this purpose, a conveyor 2 will have a slope of 3°, for example, (the drop due to the slant is often within the range of from 5/16 to ¾ inch per foot of conveyor). It is foreseen that the specific rollers 10 could be replaced with elongate rollers extending entirely between the channels 7 and 8 or by other roller devices within the scope of the present invention, by simply ensuring sufficient spacing between adjacent rollers to allow positioning of the retarder 3 therebetween. It is also foreseen that at least some of the rollers 10 may be directly or indirectly driven.

The retarder 3 is secured to the channels 7 and 8 by a support structure 17 extending therebetween. In the illustrated embodiment, the support structure 17 is an elongate downward facing and transversely aligned C-shaped channel 18 having an upwardly facing and transversely aligned C-shaped channel 19 mounted thereon.

The retarder 3 comprises a trigger 22, a first switch mechanism 23, a second switch mechanism 24, an actuator 25 and a braking member 26.

The trigger 22 is a generally L-shaped plate 29 having a free upper distal end 30 and a lower portion attached to a pivotal block 31. The block 31 is in turn mounted upon a generally horizontal and transversely aligned axle 34 which is mounted in the sides of the channel 19 such that the trigger plate 29 is able to pivot about the axle 34 such that at the top of a swinging arc associated with such pivot, the distal end 30 is above the tops of the rollers 10, and at the bottom of such arc, the distal end 30 is below the tops of the rollers 10 located on opposite sides of the trigger 22. A spring 35 is attached to the trigger end 36 of the trigger plate 29 opposite the distal end 30. The spring is also attached to the channel 19 so as to bias the end trigger 36 toward the channel 19. In this manner, the trigger plate 29 is normally biased into an upright position wherein the trigger distal end 30 extends above the top of the rollers 10 until the trigger 22 is engaged by an article 14 being transported by the conveyor 2. Upon an article 14 engaging the trigger 22, the trigger plate 29 pivots upon the axle 34 and the trigger end 36 moves upwardly. When the trigger 22 becomes disengaged from an article 14, the spring 35 biases the trigger plate 29 to rotate about the axle 34 such that the trigger end 36 moves downwardly.

Figure 5:
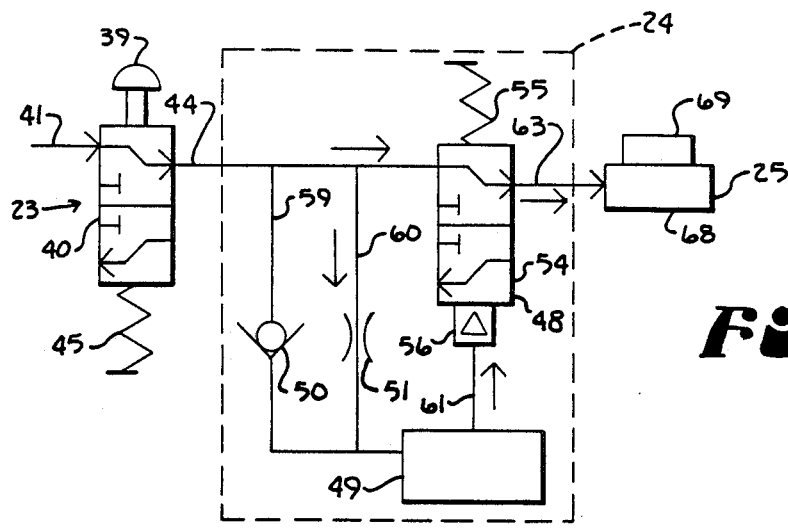
FIG. 5 is a schematic diagram of a flow controller associated with the braking system, shown in a first mode wherein an actuator is being pressurized.
Figure 6:
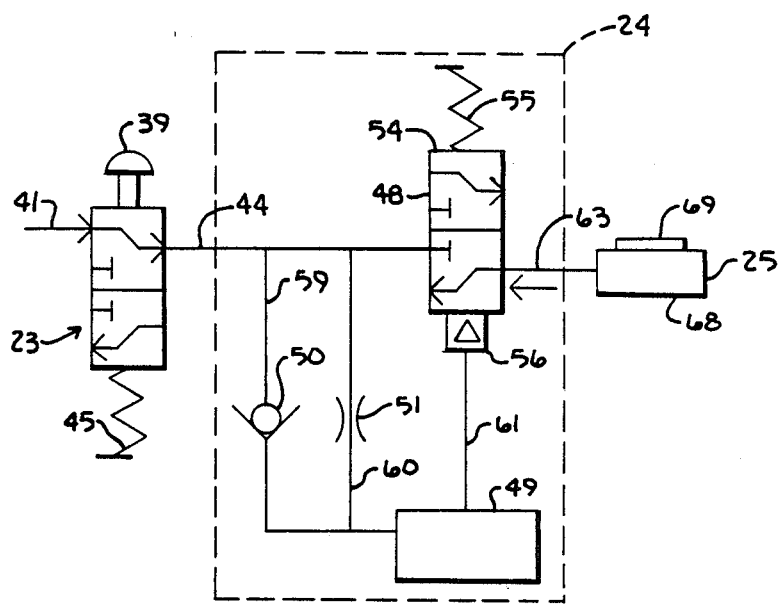
FIG. 6 is a schematic diagram of the control system of FIG. 5, showing a second mode wherein the actuator is depressurized.
Figure 7:
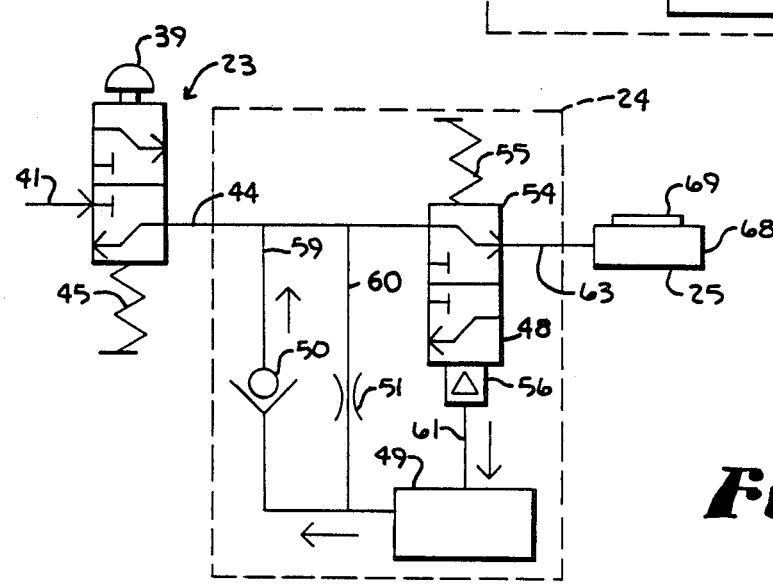
FIG. 7 is a schematic diagram similar to FIG. 5, showing the control system in a mode wherein the actuator is in a non-braking mode and an associated sensing switch is in a ready position.

The first switch mechanism 23 is a three-way button operated valve with a spring return having an actuator button 39 and a valve body 40. The body is flow connected to a source of compressed fluid, such as air, at a predetermined pressure through conduit 41. The first switch mechanism 23 is seen schematically in FIGS. 5, 6 and 7. The mechanism 23 has a first configuration as is seen in FIG. 5 in which the button 39 is undepressed and in which the compressed fluid conduit 41 is flow connected to an output conduit 44. The mechanism 23 is urged into the first configuration by a spring 45. The switch mechanism 23 has a second configuration, as seen in FIG. 7 wherein the button 39 is depressed and the valve body 40 is positioned such that there is no flow communication between the conduits 41 and 44, but rather such that the conduit 44 is allowed to exhaust to the atmosphere.

The second switch mechanism 24 comprises a three-way pilot operated valve 48 having a spring return, an accumulator 49, a check valve 50 and a restrictive orifice 51. The valve 48 is flow connected to the conduit 44 and has a valve body 54, a spring 55 biasing the valve body 54 to a first configuration thereof and an operator 56 functionally opposing the spring and urging the valve body 54 to a second configuration thereof when the operator 56 is activated.

The conduit 44 is connected with the accumulator 49 by a conduit 59 having the check valve 50 positioned intermediately therealong functionally opposing flow through the conduit 59 toward the accumulator 49. The conduit 44 is further flow connected with the accumulator 49 by a conduit 60 having the restrictive orifice 51 positioned therealong. Additionally, the accumulator 49 is flow connected with the operator 56 by a conduit 61. In the first configuration of the valve body 54, the valve body 54 is positioned such that there is flow communication between the conduit 44 and a conduit 63 flow connecting with the actuator 25, as seen in FIG. 5. The valve body 54 has a second configuration, as seen in FIG. 6, resulting when pressure from the accumulator 49 operates the operator 56 to depress the spring 55 and the valve body 54 assumes the position wherein the conduit 44 does not flow connect with the actuator 25 and fluid from the actuator is allowed to pass through the valve body 54 and exhaust to the atmosphere.

The actuator 25 includes a body 68 and an extensible piston 69 mounted within the body 68 such that compressed fluid from the conduit 63 urges the piston 69 upwardly and release of compressed fluid from the interior of the actuator 25 through the conduit 63 allows the piston 69 to move downwardly due to gravity or spring loading.

Figure 3:
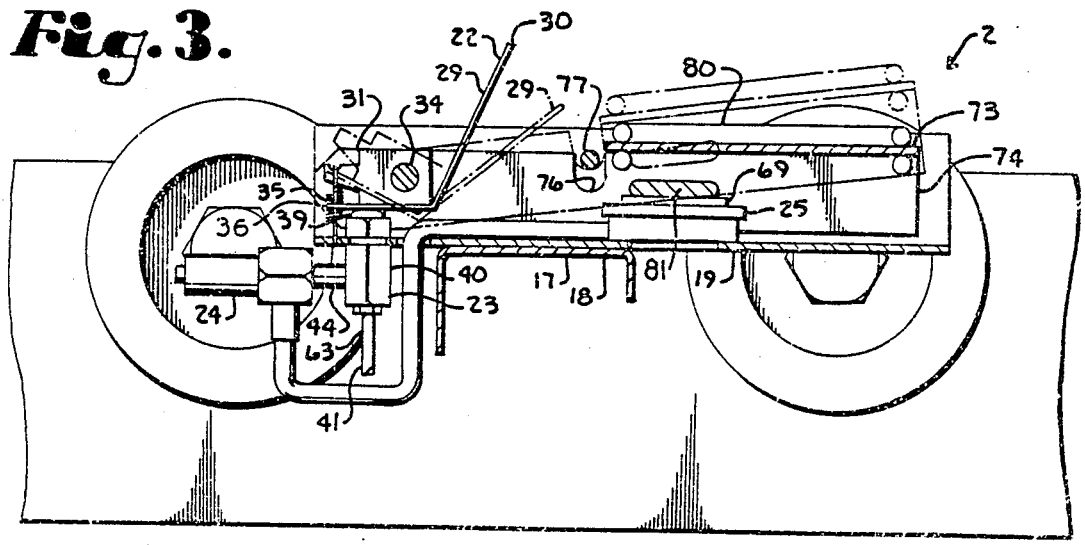
FIG. 3 is an enlarged, side elevational view of the conveyor and braking system with portions thereof broken away to show detail, showing the braking system in a non-braking configuration and also showing, in phantom lines, the braking system in a braking configuration.
Figure 4:
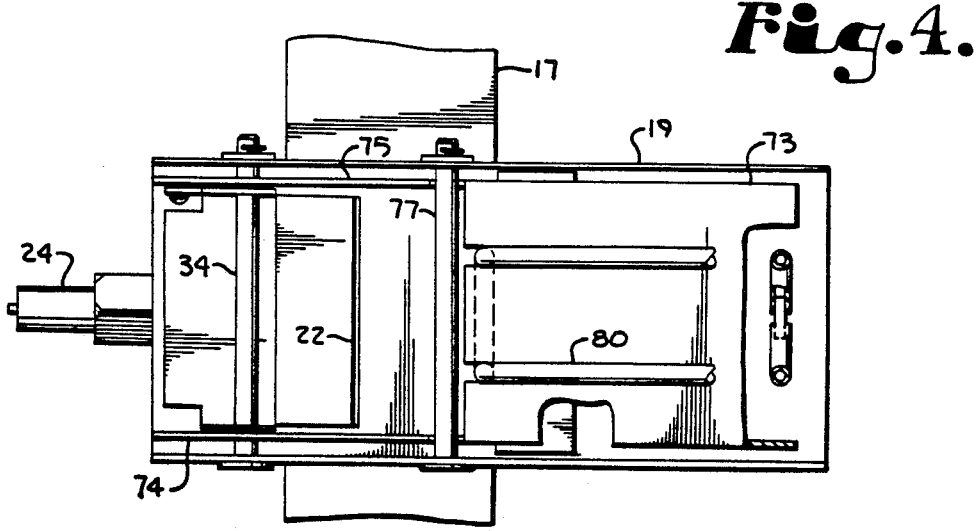
FIG. 4 is an enlarged, fragmentary top plan view of the conveyor and the braking system.

Referring to FIGS. 3 and 4, the braking member 26 includes an elongate braking plate 73 extending between two generally vertically aligned and parallel side members 74 and 75. The side members 74 and 75 are parallel to and closely spaced from the sides of the channel 19. The side members are pivotably mounted on the axle 34 so as to be rotatable about the axle 34 and such that the braking plate 73 is swingable upward and downward about the axle 34. An elongate rod or stop 77 extends between the sides of the plate 19 generally parallel to the axle 34. The brake side members 74 and 75 include apertures or slots 76 therein. The stop 77 is positioned such that the braking member 26 is free to rotate about the axle 34 only through a limited arc and, in particular, from an alignment wherein the braking plate 73 is generally horizontal to an alignment wherein the braking plate 73 extends to a preselected height above the rollers 10 and forms a ramp-like structure to engage the article 14 being transported by the conveyor 2. A bar 81 extends between the brake side members 74 and 75 and is connected thereto. The bar 81 is positioned immediately above the actuator piston 69.

A cushion 80 of elastic polymer, rubber or the like is wrapped in an over-under configuration, as seen in FIG. 4, such that a portion thereof extends above the braking plate 73 and functions to absorb shock from engagement of the braking plate 73 with articles 14 and to reduce wear thereon.

The first switch mechanism 23 is positioned beneath the trigger 22 such that the button 39 is positioned near the end 36 thereof. The actuator 25 is also positioned beneath the braking member 26 such that the piston 69 engages the bar 81 on the braking plate 73 upon extension of the piston 69 and urges the braking plate 73 upwardly as it pivots about the axle 34 until the braking plate sides 74 and 75 engage the stop 77.

In operation, articles 14 are transported down the conveyor 2 by gravity (or by driving of the rollers 10, or the like). Before the articles 14 arrive over the retarder 3, the retarder 3 is in a set or standby configuration. In this configuration, the trigger distal end 30 is positioned substantially above the rollers 10 and the first switch mechanism button 39 is depressed. Likewise, when the actuator piston 69 is withdrawn or lowered, the top of the braking member 26 is positioned below the tops of the rollers 10 located on either side of the braking member 26. At this point in time, the accumulator 49 also has a relatively low internal pressure such that the valve body 54 is in the second configuration thereof.

As the article 14 passes over the retarder 2, the leading edge of the article 14 engages the trigger distal end 30 and urges the trigger 22 to rotate to the right and downwardly, as seen in FIG. 3, until the distal end 30 is approximately at the same level as the tops of the rollers 10. In conjunction with the rotation of the trigger 22, the trigger end 36 rotates upwardly and allows the first switch mechanism button 39 to become undepressed. This configuration is schematically shown in FIG. 5.

Fluid flow from conduit 41 passes through the switch mechanism 23 into the conduit 44, through the switch mechanism 24, the conduit 63 and subsequently into the actuator 25 causing the piston 69 to extend upwardly. This, in turn, urges the braking member 26 to rotate about the axle 34 such that the braking plate is then positioned in the path of the article 14 such that the article 14 is either entirely stopped by the braking member 26 or, where the braking member 26 is positioned sufficiently low, the article 14 passes over the braking member 26 with a substantial slowing or decrease in velocity. The braking member 26 of the present embodiment provides a ramp-like effect which dissipates energy from the article 14 as it engages and rides up the member 26.

At the same time the accumulator is becoming pressurized, fluid flow is also passing through conduit 60 into the accumulator 49, but at a lower rate, as compared to the actuator 25, since the fluid must pass through the restrictive orifice 51 in conduit 60 to reach the accumulator 47. The orifice 51 restricts the fluid flow so that the accumulator achieves the full pressure of the fluid from the conduit 41 only after a substantial delay subsequent to the first switch mechanism 23 being opened to allow flow therethrough.

Upon the accumulator 49 reaching a preselected pressure, the operator 56 is energized to overcome the bias of the spring 55 and position the valve body 54 in the position seen in FIG. 6. At this time, the pressure bleeds from the interior of the actuator 25 into the atmosphere relatively quickly and the piston 69 depresses, thereby allowing the braking member 26 to lower below the tops of the adjacent roller 10 and consequently allowing the article 14 to proceed onwardly without restriction by the braking member 26. After the article 14 has cleared the trigger 22, the trigger 22 is urged to rotate upwardly to the left, as seen in FIG. 3, about the axle 34 by the spring 35. Upon rotation of the trigger 22, the trigger lower end 36 engages and depresses the first switch mechanism button 39, such that the valving configuration seen in FIG. 7 occurs. At this time, the conduit 41 no longer flow communicates with the conduit 44 and the conduit 44 is exhausted to the atmosphere. Fluid pressure from the accumulator 49 passes through the conduit 59 and the check valve 50 at a relatively faster rate than through the orifice 51 to be exhausted to the atmosphere through the conduit 44 and mechanism 23. Upon the release of pressure from the accumulator 49, the operator 56 allows the valve body 54 to return to the position shown in FIG. 7 wherein the conduit 44 is in flow communication with the conduit 63.

The time delay between the article 14 engaging the trigger 22 and the withdrawal of the piston 69 and consequently the braking member 26 can be modified by adjusting the size of the orifice 51 or the accumulator 49 or by other modifications to allow a longer or shorter braking time most suited for the particular application.

Figure 8:
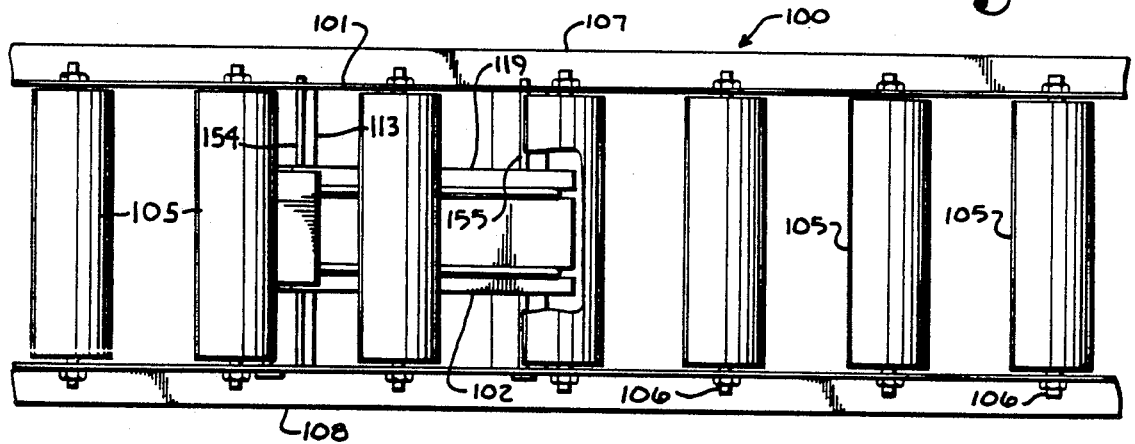
FIG. 8 is a top plan view of a conveyor and including a modified embodiment of a braking system in accordance with the present invention.
Figure 9:
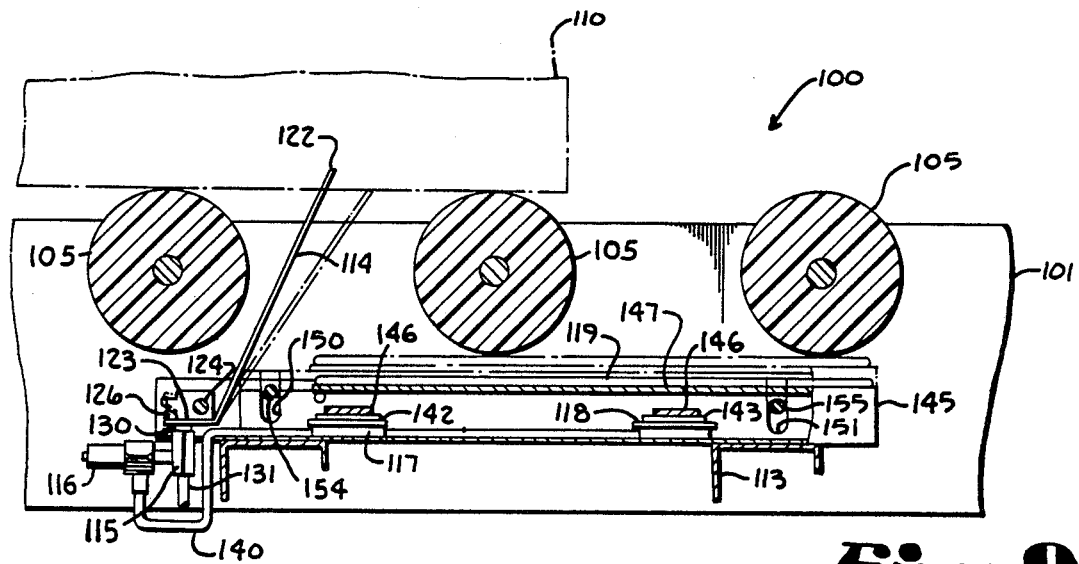
FIG. 9 is a side elevational view of the conveyor and modified braking system of FIG. 8 showing the braking system in a non-braking mode thereof and showing, in phantom lines, a braking mode thereof.

Shown in FIGS. 8 and 9 are a conveyor system 100 including roller conveyor 101 and a modified conveyor retarder 102, in accordance with the present invention.

The conveyor 101 includes a plurality of elongate rollers 105 which rotate upon axles 106 secured on opposite sides to a pair of parallel channels 107 and 108. The rollers 105 are generally parallel and equally spaced. A box, pallet or other similar article 110 is conveyed along the tops of the rollers 105 by gravity.

The retarder 102 includes the support structure 113, a trigger 114, a first switch mechanism 115, a second switch mechanism 116, a pair of actuators 117 and 118 and a braking member 119. Much of the system 100 functions in the same manner as the system 1 and, therefore, this description will be directed mainly to the parts of the system 100 which function differently or have different structures as compared to the system 1.

The trigger 114 has a distal article engaging upper end 122 and a lower portion 123 and is rotatable upon an axle 124, which axle 124 is generally parallel to the rollers 105. The trigger lower portion 123 is urged by a spring 126 positioned at a spaced location from the axle 124 to rotate downwardly, as seen in FIG. 9. The first switch mechanism 115 includes a switch button 130 which extends upwardly and engages the trigger lower portion 123. A conduit 131 is flow connected with a compressed air source which is utilized as compressed fluid within the first switch mechanism 115.

The second switch mechanism 116 is similar to the switch 24 of the previous embodiment and is flow connected to the first switch mechanism 115. A conduit 140 flow connects the second switch mechanism 116 with the actuators 117 and 118. The actuators 117 and 118 include pistons 142 and 143 respectively which are urged upwardly when the interior of the actuators 117 and 118 are pressurized by pressurized fluid passing through the conduit 140.

The braking member 119 includes a somewhat rectangularly shaped apparatus 145 having a pair of generally horizontally aligned lower bars 146 fixed to and extending between sides 152 and 153 thereof which engage the pistons 142 and 143 and an upper, generally planar and horizontally aligned surface 147, which is positioned generally parallel to the lower edges of the rollers 105. The apparatus 145 includes two slots 150 and 151 therein which extend from the upper surface 147 along the opposite sides 152 and 153 of the apparatus 145. Positioned in the slot 150 is a rod 154 and positioned in the slot 151 is a rod 155. The rods 154 and 155 are mounted on the support structure 113 so as to be nonmovable relative to the apparatus 145 and consequently function as stops when the lower edges of the slots 150 and 151 engage the rods 154 and 155 respectively.

In use, the conveyor system 100 is similar to the conveyor system 1 and, in particular, the retarder 102 acts in a manner similar to the retarder 2 except, instead of positioning a braking member directly in line with the article 110 so as to engage it and either retard it or completely stop it, the braking member 119 is urged upwardly by the actuators 142 and 143 when an article 110 is sensed by the trigger 122 by operation of the first switch mechanism 115 and second switch mechanism 116 as in the previous embodiment. As the braking member 119 is urged upwardly, the upper surface 147 engages a plurality of the rollers 105 directly thereabove and prevents these rollers 105 from rotating such that the article 110 no longer freely moves along the conveyor 101 and is either stopped completely or substantially slowed by activation of the retarder 2. As with the previous embodiment, when the compressed fluid is bled from the actuators 117 and 118, the pistons 142 and 143 return to a nonextended position and the braking member moves downwardly due to gravity and away from the rollers 105 so as to allow the rollers to freely rotate again.

It is foreseen that in the case of either of the previously discussed embodiments, that it is possible to set the delay time for releasing the compressed fluid from the actuators by any number of different methods including, but not limited to, modifying the size of the accumulator, changing the pressure required to activate the operator, changing the flow restriction within the conduit going to the accumulator and the like.

It is to be understood that while certain forms of the present invention have been illustrated and described herein, it is not to be limited to the specific forms or arrangement of parts described and shown.

What is claimed and desired to be secured by Letters Patent is as follows:

1. A conveyor system including a conveyor adapted to transport articles therealong and a retarder adapted to reduce the velocity of articles being transported along said conveyor; said retarder comprising
    (a) trigger means adapted to sense an article passing along said conveyor in proximity to but upstream of said retarder:
    (b) a first switch mechanism cooperatively connected with said trigger means such that, when said trigger means senses an article in close proximity to said retarder, said trigger means activates said first switching mechanism to a first configuration thereof, and said trigger mechanism activates said switching mechanism to a second configuration thereof when an article is not in close association to said retarder;
    (c) said first switching mechanism being in flow communication with a source of compressed fluid;
    (d) a second switching mechanism flow communicating with said first switching mechanism and having a first configuration and a second configuration;
    (e) an actuator cooperating with said second switch mechanism;
    (f) a braking member having a braking configuration wherein said braking member is adapted to retard an article passing along said conveyor; said braking member having a nonbraking configuration wherein said braking member is adapted to not retard an article passing along said conveyor; said first switch mechanism, said second switch mechanism and said actuator having flow communication therebetween such that when said first switch mechanism is in the first configuration thereof and said second switch mechanism is in the first configuration thereof, said source of pressurized fluid flow communicates through said second switch mechanism with said actuator and said actuator cooperates with said braking member so as to urge said braking member into the braking configuration thereof; and
    (g) said second switch mechanism including delay means to modify said second switch mechanism into the second configuration thereof wherein said source of pressurized fluid is not flow communicated with said actuator and said actuator is allowed to vent fluid pressure therefrom, such that said actuator no longer urges said braking member into the braking configuration thereof and allows the braking member to return to the nonbraking configuration thereof.

2. The system according to Claim 1 wherein said second switch mechanism comprises
    (a) a conduit flow communicating with said first switch mechanism;
    (b) an accumulator flow connected to said conduit;
    (c) a valve body allowing flow of fluid from said conduit to said actuator when said second switch mechanism is in the first configuration thereof and preventing such flow when said second switch mechanism is in the second configuration thereof;
    (d) an operator cooperating with said accumulator to modify said valve body such that said first switch mechanism is motivated from the first configuration to the second configuration thereof when fluid pressure in said accumulator reaches a preselected pressure thereby releasing fluid pressure from said actuator and allowing said braking member to move to the nonbraking configuration thereof; and
    (e) said delay means comprises a flow restrictive orifice in said conduit between said first switch mechanism and said accumulator allowing said accumulator to pressurize relatively slower than said actuator.

3. The system according to Claim 2 wherein
    (a) said conveyor includes a plurality of rollers; and
    (b) said braking member is at least partly positioned above adjacent rollers when in the braking configuration thereof and is positioned below the tops of said adjacent rollers when in the nonbraking configuration thereof.

4. The system according to Claim 2 wherein:
    (a) said conveyor includes a plurality of rollers; and
    (b) said braking member is biased against at least one of said rollers when in the braking configuration thereof and substantially engages none of said rollers when in the nonbraking configuration thereof.

5. The system according to Claim 2 wherein:
    (a) said conduit includes a first path having said orifice therein and a second path having a check valve therein; said check valve being oriented such that, when said conduit is vented to atmosphere, fluid flows from said accumulator through said check valve to said first switch mechanism relatively unrestricted as compared to fluid passage through said orifice.

6. A roller conveyor having a plurality of spaced rollers adapted to transport articles therealong and aligned at a slight inclination to horizontal such that articles are conveyed therealong by gravity in combination with an article retarder for decreasing the velocity of articles being transported along the conveyor as the articles pass over the article retarder; said retarder comprising:

(a) trigger means adapted to sense articles passing along said conveyor in close proximity to said trigger means;

(b) a first switch mechanism operably connected to said trigger means such that said trigger means activates said first switching mechanism to a first configuration thereof when said trigger means senses an article being transported along said conveyor in close proximity to said trigger means and said trigger means activates said first switching mechanism to a second configuration thereof when no article is being sensed by said trigger means; said first switching mechanism being operably connected to a source of pressurized fluid;

(c) a second switching mechanism flow communicating with said first switching mechanism and having first and second configurations associated therewith;

(d) an actuator in communication with said second switching mechanism such that, when said second switching mechanism is in the first configuration thereof and said first switch mechanism is in the first configuration thereof, said actuator is in direct flow communication with said fluid and said fluid pressurizes said actuator;

(e) delay means associated with said second switching mechanism for motivating said second switching mechanism from the first configuration thereof to the second configuration thereof after a preselected period of time; said actuator communicating with said second switch mechanism when in the second configuration thereof such that fluid pressure is released from said actuator;

(f) a braking member operably positioned between an adjacent pair of said rollers; said braking member being operably biased upwardly by said actuator when fluid pressure is applied to said actuator such that said braking member operably is positioned above the tops of said adjacent rollers and is adapted to retard passage of an article along said conveyor; said braking member automatically having a second position when fluid pressure is released from said actuator such that said braking member is positioned below the tops of said adjacent rollers and is thereafter adapted to allow free passage of an article along said conveyor.

7. The system according to Claim 6 wherein said second switch mechanism comprises (a) a conduit flow communicating with said first switch mechanism;

(b) an accumulator flow connected to said conduit;

(c) a valve body allowing flow of fluid from said conduit to said actuator when said second switch mechanism is in the first configuration thereof and preventing such flow when said second switch mechanism is in the second configuration thereof;

(d) an operator cooperating with said accumulator to modify said valve body such that said first switch mechanism is motivated from the first configuration to the second configuration thereof when fluid pressure in said accumulator reaches a preselected pressure thereby releasing fluid pressure from said actuator and allowing said braking member to move to the nonbraking configuration thereof; and (e) said delay means comprises a flow restrictive orifice in said conduit between said first switch mechanism and said accumulator allowing said accumulator to pressurize relatively slower than said actuator.

8. A roller conveyor having a plurality of spaced rollers adapted to transport articles therealong and aligned at a slight inclination to horizontal such that articles are conveyed therealong by gravity in combination with an article retarder for decreasing the velocity of articles being transported along the conveyor as the articles pass over the article retarder; said retarder comprising:

(a) trigger means adapted to sense articles passing along said conveyor in close proximity to said trigger means;

(b) a first switch mechanism operably connected to said trigger means such that said trigger means activates said first switching mechanism to a first configuration thereof when said trigger means senses an article being transported along said conveyor in close proximity to said trigger means and said trigger means activates said first switching mechanism to a second configuration thereof when no article is being sensed by said trigger means; said first switching mechanism being operably connected to a source of pressurized fluid;

(c) a second switching mechanism flow communicating with said first switching mechanism and having first and second configurations associated therewith;

(d) an actuator in communication with said second switching mechanism such that, when said second switching mechanism is in the first configuration thereof and said first switch mechanism is in the first configuration thereof, said actuator is in direct flow communication with said fluid and said fluid pressurizes said actuator;

(e) delay means associated with said second switching mechanism for motivating said second switching mechanism from the first configuration thereof to the second configuration thereof after a preselected period of time; said actuator communicating with said second switch mechanism when in the second configuration thereof such that fluid pressure is released from said actuator;

(f) a braking member operably positioned beneath at least one selected roller of said rollers and relatively near said sensing location associated with said trigger means; said braking member being operably biased upwardly by said actuator when fluid pressure is applied to said actuator such that said braking member operably is biased against said selected roller so as to retard rotation of said selected roller and thereby is adapted to retard passage of an article along said conveyor; said braking member moving to a second position when fluid pressure is released from said actuator such that said braking member is thereafter positioned substantially away from said selected roller and said selected roller is thereafter free to rotate and adapted to allow free passage of an article along said conveyor.

9. The system according to Claim 8 wherein said second switch mechanism comprises:
   (a) a conduit flow communicating with said first switch mechanism;
   (b) an accumulator flow connected to said conduit;
   (c) a valve body allowing flow of fluid from said conduit to said actuator when said second switch mechanism is in the first configuration thereof and preventing such flow when said second switch mechanism is in the second configuration thereof;
   (d) an operator cooperating with said accumulator to modify said valve body such that said first switch mechanism is motivated from the first configuration to the second configuration thereof when fluid pressure in said accumulator reaches a preselected pressure thereby releasing fluid pressure from said actuator and allowing said braking member to move to the nonbraking configuration thereof; and
   (e) said delay means comprises a flow restrictive orifice in said conduit between said first switch mechanism and said accumulator allowing said accumulator to pressurize relatively slower than said actuator.

10. In a roller conveyor wherein a retarder is utilized to reduce the velocity of articles along the conveyor by use of a brake member which is selectively biased to retard passage of articles along the conveyor and said retarder includes trigger means to sense an article in proximity to said retarder and biasing means cooperatively connected to said trigger means for selectively urging said brake member into a braking configuration thereof, the improvement comprising:
   (a) switching means comprising a first switch controlled by said trigger means and a second switch normally positioned to cause said brake member to be applied by said biasing means and operably connecting said trigger means to said brake member and including delay means; said delay means limiting the period of time said brake member is applied while said trigger means senses an article by repositioning said second switch to operably modify said brake member from the braking configuration thereof to a non-braking configuration thereof after said period of time; and wherein:
   (b) said period of time is preselected and is non-dependent upon a weight associated with articles passing along said conveyor.

* * * * *